C. H. WEST.
POWER TRANSMITTING DEVICE.
APPLICATION FILED APR. 16, 1917.
1,242,289.
Patented Oct. 9, 1917.
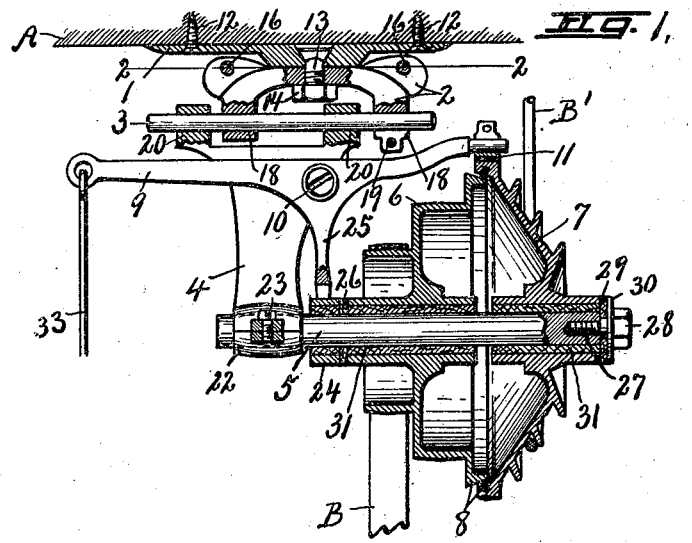
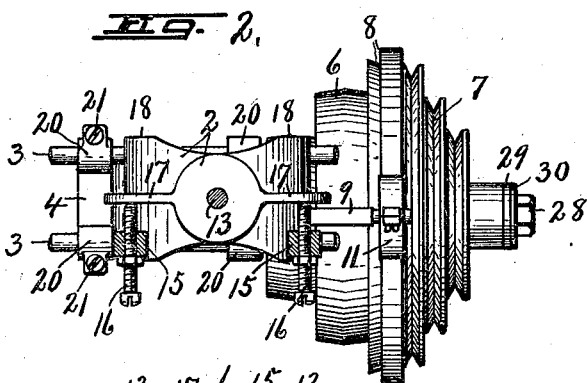
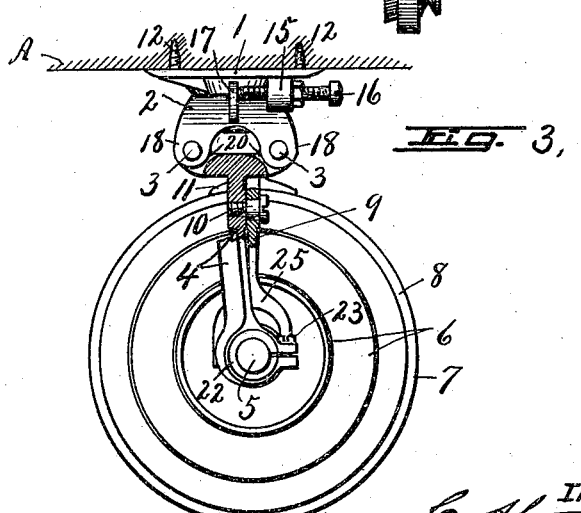
WITNESSES:
INVENTOR
C. H. West
BY
ATTORNEY.

UNITED STATES PATENT OFFICE.

CHARLES H. WEST, OF SYRACUSE, NEW YORK.

POWER-TRANSMITTING DEVICE.

1,242,289.  Specification of Letters Patent.  Patented Oct. 9, 1917.

Application filed April 16, 1917. Serial No. 162,491.

*To all whom it may concern:*

Be it known that I, CHARLES H. WEST, a citizen of the United States of America, and resident of Syracuse, in the county of Onondaga, in the State of New York, have invented new and useful Improvements in Power-Transmitting Devices, of which the following, taken in connection with the accompanying drawings, is a full, clear, and exact description.

This invention relates to certain improvements in power-transmitting devices adapted to be suspended from the under side of sewing machine tables, as commonly used in garment factories where the sewing machines are usually driven by power from a line shaft running lengthwise of the table.

In factories of this character, it is customary to provide means for transmitting power at variable speeds from the line shaft to each machine, and it is highly important that the power-transmitting pulleys be properly alined with the driving pulley on the line shaft, and also with the driven pulley on the head of the sewing machine in order to obtain the most efficient results as to power and economy in the use of belts.

One of the objects, therefore, is to provide simple and efficient means whereby the power-transmitting device between the driving and driven elements involving the use of coaxial cone pulleys having coöperative clutch faces may be easily and quickly alined with said driving and driven elements, while said elements are in operation without danger to the operator.

In other words, I have sought to support the pulleys upon a suitable hanger and to enable the hanger with the pulleys thereon to be adjusted bodily about a vertical axis, and also lengthwise of the axis of the pulleys to produce the desired alinement with the driving and driven elements.

Other objects and uses relating to specific parts of the device will be brought out in the following description.

In the drawings—

Figure 1 is a longitudinal vertical sectional view of a power-transmitting device of the character described, embodying the various features of my invention.

Fig. 2 is a top plan of the same, omitting the top plate which is secured to the under side of the table, taken on line 2—2, Fig. 1.

Fig. 3 is an end view, partly in section and partly broken away, of the same apparatus shown in Fig. 1.

As illustrated, this power-transmitting device comprises a top plate —1—, a yoke —2— carrying a pair of lengthwise guide rods —3— and a hanger —4—, upon which is mounted a horizontal shaft —5— carrying a pair of coaxial cone pulleys —6— and —7—, said pulleys being provided with coöperative clutch faces —8— for transmitting motion from one to the other.

A suitable brake lever —9— is pivoted at —10— to the hanger —4— and provided with a brake shoe —11— for engagement with the periphery of the cone pulley —7— for checking the momentum of the latter when released by the withdrawal of the cone pulley —6— therefrom in a manner hereinafter described.

The top plate —1— is secured by screws —12— to the under side of the table top, as —A—, of a sewing machine, not shown, and is provided with a central apertured hub in which is seated a pivotal bolt —13— passing through a central opening in the yoke —2— and provided with a nut —14— for holding the yoke in operative position upon the plate —1—.

This top plate —1— is also provided with a pair of pendent lugs —15— located at equal distances from and at opposite sides of the center thereof and with threaded apertures for receiving a pair of adjusting screws —16—.

The yoke —2— is provided with a pair of diametrically opposite radially extending lugs —17— projecting across the inner ends of the adjusting screws —16— and adapted to be engaged thereby for adjusting said yoke and parts carried thereby about the axis of the pivotal bolt —13—, said yoke having its opposite ends provided with separate pairs of pendent apertured lugs —18— for receiving and supporting the guide rods —3—, the lugs —18— at one end being split radially and provided with a clamping screw —19— for tightening the same upon the adjacent portions of the guide rods.

The pairs of lugs —18— at the end of the yoke are also spaced some distance apart and extend downwardly a sufficient distance below the lower face of the nut —14— to allow the hanger —4— to slide freely lengthwise of and upon the guide rods —3—, which latter are spaced apart in parallelism lengthwise of the device, and also parallel with the axis of the shaft —5—.

The hanger —4— is also provided at each end with a pair of lugs —20—, those of one pair being spaced some distance apart from those of the other pair and opposite sides of one pair of lugs —18—, leaving sufficient clearance between the lugs —18— and —20— to allow a limited endwise movement of the hanger —4— relatively to the yoke —2—.

The lugs —20— at one end of the hanger are preferably split through one side and provided with clamping bolts —21— by which they may be tightened upon the adjacent portions of the guide rods —3— to hold the hanger in its adjusted position upon the guide rods, although it is evident that the pair of split lugs —18— may serve a similar purpose of permitting lengthwise adjustment of the guide rods and holding the same with the hanger thereon in their adjusted position.

In other words, the guide rods are adjustable relatively to the yoke and hanger, while the hanger is adjustable with or relatively to the guide rods.

The hanger extends downwardly some distance below the yoke —2— and is provided at its lower end with a split hub —22— having a clamping bolt —23— for tightening the same upon the adjacent portion of the shaft —2— and permitting said shaft to be adjusted endwise relatively to the hanger if necessary.

The shaft —5— extends horizontally a sufficient distance at one side of the hub —22— to receive the cone pulleys —6— and —7— and a suitable collar —24— which is located between the hub —22— and adjacent end of the hub of the pulley —6— and is provided with opposite grooved sides for receiving the adjacent ends of a shifting arm —25— which forms a part of the lever —9—.

An end-thrust washer —26— is mounted upon the shaft —5— between the collar —24— and adjacent end of the pulley —6— and is preferably made of wood saturated with oil to reduce friction between those parts.

The outer end of the shaft is provided with a threaded aperture or socket —27— for receiving a screw —28—, upon which is mounted a pair of washers —29— and —30—, the washer —30— being preferably made of metal to engage the head of the screw, while the washer —29— is made of wood and saturated with oil to engage the adjacent end of the hub of the pulley —7— to hold the latter against endwise displacement from the shaft, and at the same time to reduce friction between said pulley and metal washer —30—.

Both of the pulleys —6— and —7— and also the collar —24— are provided with wood bushings —31— saturated with oil for self-lubrication and economy in replacement when worn without destroying or reboring the pulleys and collar.

The lever —9— is fulcrumed intermediate its ends at —10—, one arm being provided with a brake-shoe —11— having a split hub clamped to said arm, while the other arm is provided with a rod or cable —33— extending to a point within easy reaching distance of the operator.

The pulley-shifting arm —25— extends downwardly from the intermediate portion of the lever —9— so that when the arm to which the rod or cable —33— is attached is drawn downwardly, the clutch face of the pulley —6— will be forced into frictional engagement with the companion clutch face of the pulley —7— to transmit motion to the latter, during which movement the arm carrying the brake-shoe —12— will be forced upwardly to remove the brake-shoe from engagement with the pulley —7—.

The other end of the cones of the pulley —6— may be connected by a belt —B— to the usual power-driven driving shaft, not shown, while either of the cones of the other pulley —7— may be connected by a belt —B'— to the shaft of the sewing machine which is also omitted as being unnecessary to herein illustrate or describe.

One advantage of this power-transmitting device is that its various parts may be easily and quickly assembled as a unitary article of manufacture and readily placed in operative position upon the under side of the sewing machine table and adjusted ready for use, or the various parts may be assembled in sequence as follows:

The base plate —1— with the pivotal bolt —13— thereon may be first secured to the under side of the table —A— and the yoke —2— then clamped in place by the nut —14—, after which the hanger —4— may be placed with its bearings —20— in alinement with the bearings —18— and the rods —3— inserted therethrough and clamped by split hubs —18— and —20—.

The shaft —5— may then be secured in place with one end in the bearings —22—, whereupon the collar —24—, washer —26— and pulleys —6— and —7— may be placed in sequence upon the shaft and secured in place by the washers —20— and —30— and cap screw —28—.

The lever —9— may then be secured in place by the clamping screw —10— with the arm —25— in operative engagement with the collar —24— and the brake-shoe —11— in alinement with the periphery of the pulley —7—.

If, after the power transmitter has been placed in approximately its proper position with relation to the driving and driven pulleys, not shown, and the shaft —5— is found to be more or less out of parallelism with the main line shaft, not shown, it may be quickly adjusted into parallelism by means of the screws —16— even while the machine is in operation without in any way endangering the operator.

On the other hand, if it is found that the pulleys —6— and —7— are not in proper alinement with their respective driving and driven pulleys, not shown, they may be shifted endwise or axially by simply loosening the clamping hubs —18— or —20—, or both, and sliding the hanger —4— carrying the said pulleys endwise until the pulleys are brought into proper alinement with said driving and driven members, whereupon the previously loosened clamping hubs —18— or —20— may be retightened to hold the hanger and pulleys thereon in their adjusted positions.

Any of these adjustments may be made with perfect safety while the machine is in operation and when the pulleys are properly adjusted and it is desired to start the machine, all that is necessary to do is to draw down on the rod or cable —33— which will shift the continuously rotating pulley —6— into frictional engagement with the cone pulley —7—, thereby transmitting motion to the latter and to the shaft of the machine head to which it is connected.

On the other hand, when it is desired to stop the sewing machine, the rod or cable —33— may be released or moved upwardly, thereby withdrawing the collar —24— from the adjacent end of the pulley —6—, and at the same time applying the brake —11— to the periphery of the pulley —7— to retard the rotation of the last-named pulley and allow the continuously rotating pulley —6— to free itself from such frictional engagement with the pulley —7—, the crowning belt surfaces of the pulley —6— engaged by the belt —B— serving to facilitate the withdrawal of the pulley —6— from the pulley —7— when released by the withdrawal of the collar —24— by reason of the fact that the driving belt —B— tends to center itself upon the crowning face of the pulley.

What I claim is:

1. In a power-transmitting device of the character described, the combination with a supporting table, a plate secured to the under side of said table, a pivotal bolt on said plate, a yoke pivotally mounted on the under side of the plate to swing horizontally about the axis of the bolt, a nut on the bolt for holding the yoke in operative position, adjusting screws on the plate engaging portions of the yoke for adjusting the same about its axis, guide rods mounted on the yoke, a hanger supported on the guide rods and adjusted in the direction of length of the guide rods, a shaft secured at one end to the hanger, coaxial pulleys mounted end to end upon the shaft and provided with cooperative clutch faces, a collar movable lengthwise of and upon the shaft for shifting one of the pulleys into engagement with the other pulley, a lever pivotally mounted on the hanger and provided with a pendent arm engaging said collar for shifting the same endwise, and a brake-shoe mounted on the lever and movable into and out of engagement with the periphery of one of said pulleys as the lever is rocked in reverse directions.

2. In a power-transmitting device of the character described, the combination of a main supporting plate and a yoke pivotally mounted thereon, means for adjusting the yoke about the axis of said pivot, a hanger mounted upon the yoke and adjustable endwise at right angles to said axis, a shaft secured at one end to the hanger, a pair of cone pulleys mounted on the shaft, one of which is movable axially into and out of frictional engagement with the other pulley, and means on the hanger for shifting the axially movable pulley endwise.

3. In a power-transmitting device of the character described, the combination of a main supporting plate and a yoke pivotally mounted thereon, means for adjusting the yoke about the axis of said pivot, a hanger mounted upon the yoke and adjustable endwise at right angles to said axis, a shaft secured at one end to the hanger, coaxial pulleys mounted end to end upon the shaft, movable means at the opposite end of the shaft for holding the pulleys against endwise displacement therefrom, and means on the hanger for shifting one of the pulleys into and out of frictional engagement with the other.

4. In a power-transmitting device of the character described, the combination of a base plate, a yoke pivotally mounted thereon to swing about a vertical axis, means for adjusting the yoke about said axis, a hanger adjustable lengthwise of and upon the yoke at right angles to said axis, a shaft mounted on the hanger and extending horizontally therefrom, and a pulley mounted on the shaft.

5. In a power-transmitting device of the character described, the combination of a hanger, means for adjusting the hanger about a vertical axis, additional means for adjusting the hanger at right angles to said axis, a shaft secured at one end to the hanger, a pair of coaxial pulleys having wood bushings journaled on the shaft and saturated with a lubricant, means for moving one of said pulleys into and out of frictional engagement with the other pulley, and movable means on the opposite end of the shaft for holding the pulleys against endwise displacement therefrom and for permitting both pulleys to be removed and replaced from and upon said end of the shaft.

6. In a power-transmitting device of the character described, the combination of a hanger, means for adjusting the hanger about a vertical axis, additional means for adjusting the hanger at right angles to said axis, a shaft secured at one end to the hanger, a collar having an oil-saturated wood bushing journaled on the shaft, a pair of coaxial pulleys having oil-saturated wood bushings also journaled on the shaft, an oil-saturated wood washer between the collar and adjacent end of one of the pulleys, a cap screw tapped into the opposite end of the shaft and provided with a metal washer, an oil-saturated wood washer between the metal washer and end of the adjacent pulley, and means for moving the collar axially on the shaft to force one of the pulleys into frictional engagement with the other pulley.

In witness whereof I have hereunto set my hand this 11th day of April, 1917.

CHARLES H. WEST.

Witnesses:
H. E. CHASE,
ALICE M. CANNON.

Copies of this patent may be obtained for five cents each, by addressing the "Commissioner of Patents, Washington, D. C."